(12) United States Patent
Blad

(10) Patent No.: US 10,801,737 B2
(45) Date of Patent: Oct. 13, 2020

(54) METHOD FOR ADAPTING A HEATING CURVE

(71) Applicant: GRUNDFOS HOLDING A/S, Bjerringbro (DK)

(72) Inventor: Thomas Blad, Bjerringbro (DK)

(73) Assignee: GRUNDFOS HOLDING A/S, Bjerringbro (DK)

(*) Notice: Subject to any disclaimer, the term of this patent is extended or adjusted under 35 U.S.C. 154(b) by 704 days.

(21) Appl. No.: 15/028,576

(22) PCT Filed: Oct. 8, 2014

(86) PCT No.: PCT/EP2014/071566
§ 371 (c)(1),
(2) Date: Apr. 11, 2016

(87) PCT Pub. No.: WO2015/055482
PCT Pub. Date: Apr. 23, 2015

(65) Prior Publication Data
US 2016/0245533 A1    Aug. 25, 2016

(30) Foreign Application Priority Data

Oct. 15, 2013 (EP) .................................... 13188789

(51) Int. Cl.
*F24D 19/10* (2006.01)
*F04D 15/00* (2006.01)
*G05D 23/19* (2006.01)

(52) U.S. Cl.
CPC ......... *F24D 19/1012* (2013.01); *F04D 15/00* (2013.01); *F04D 15/0066* (2013.01);
(Continued)

(58) Field of Classification Search
CPC .................................................. F24D 19/1012
(Continued)

(56) References Cited

U.S. PATENT DOCUMENTS 2,297,705 A * 10/1942 Jehle .................. H01H 35/2635
200/81.5
4,290,551 A * 9/1981 Johnstone .............. G05D 23/24
236/9 R
(Continued)

FOREIGN PATENT DOCUMENTS

CN          101563568 A     10/2009
CN          201672603 U     12/2010
(Continued)

OTHER PUBLICATIONS

Hennel, et al., DE 4312150 A1 English machine translation, Dec. 15, 1994.*
(Continued)

*Primary Examiner* — Edelmira Bosques
*Assistant Examiner* — Phillip Decker
(74) *Attorney, Agent, or Firm* — McGlew and Tuttle, P.C.

(57) ABSTRACT

A method for adapting the control of the feed temperature of a heating installation to a building to be heated or at least to a building part to be heated, with which the heating installation supplies the building or the building part with heat by way of a heat transfer medium led in the circuit. The circuit comprises at least one temperature-controlled heating circuit. The flow rate of the heat transfer medium in the circuit is registered in a continuous manner or in temporal intervals. The adaptation of the control of the feed temperature is effected automatically in dependence on the registered values.

20 Claims, 4 Drawing Sheets

(52) U.S. Cl.
CPC ..... *F24D 19/1009* (2013.01); *G05D 23/1934* (2013.01); *Y02B 30/745* (2013.01); *Y02B 30/762* (2013.01)

(58) Field of Classification Search
USPC .......................................................... 237/8 A
See application file for complete search history.

(56) References Cited

U.S. PATENT DOCUMENTS

| | | | | |
|---|---|---|---|---|
| 4,381,075 | A * | 4/1983 | Cargill | G05D 23/24 236/46 R |
| 5,158,436 | A * | 10/1992 | Jensen | H02H 7/0833 417/32 |
| 5,622,221 | A * | 4/1997 | Genga, Jr. | F24D 19/1012 165/208 |
| 7,854,597 | B2 * | 12/2010 | Stiles, Jr. | F04D 27/004 417/44.11 |
| 7,971,796 | B2 * | 7/2011 | Roques | F24H 1/20 219/506 |
| 9,063,551 | B2 | 6/2015 | Deivasigamani | G05D 7/0629 |
| 9,519,297 | B1 * | 12/2016 | Virskus | G05D 23/1927 |
| 9,982,675 | B2 * | 5/2018 | Jensen | H02H 7/0833 |
| 10,465,919 | B2 * | 11/2019 | O'Connor | F24D 19/1015 |
| 2009/0001186 | A1 * | 1/2009 | Cohen | F24D 19/1009 237/8 A |
| 2011/0019980 | A1 * | 1/2011 | Harper | F24D 11/004 392/312 |
| 2011/0135515 | A1 * | 6/2011 | Jensen | F24D 11/003 417/410.1 |
| 2012/0029707 | A1 * | 2/2012 | Dazai | F24D 19/1039 700/282 |
| 2013/0000732 | A1 * | 1/2013 | Flashaar | F24D 19/1012 137/1 |
| 2013/0048745 | A1 * | 2/2013 | Johnson, Jr. | F22B 35/00 237/8 A |
| 2015/0102120 | A1 * | 4/2015 | Sorensen | F24D 19/1018 237/8 A |
| 2016/0169239 | A1 * | 6/2016 | Mortensen | F04D 15/0066 126/646 |

FOREIGN PATENT DOCUMENTS

| | | | |
|---|---|---|---|
| DE | 29 40 790 C1 | 3/1982 | |
| DE | 36 20 929 A1 | 1/1988 | |
| DE | 3620929 A1 * | 1/1988 | ......... F24D 19/1009 |
| DE | 43 12 150 A1 | 12/1994 | |
| DE | 101 63 987 A1 | 7/2003 | |
| DE | 10 2008 054043 A1 | 5/2010 | |
| EP | 1 933 097 A1 | 6/2008 | |
| GB | 2470958 A * | 12/2010 | ......... F24D 19/1009 |

OTHER PUBLICATIONS

Vadstrup, et al., EP 1933097 A1 English machine translation, Jun. 18, 2008.*

Kallesoee et al., DE 10163987 A1 English machine translation, Jul. 10, 2003.*

Eibl, et al, De 3620929 Al English machine translation, Jan. 7, 1988 (Year: 1988).*

* cited by examiner

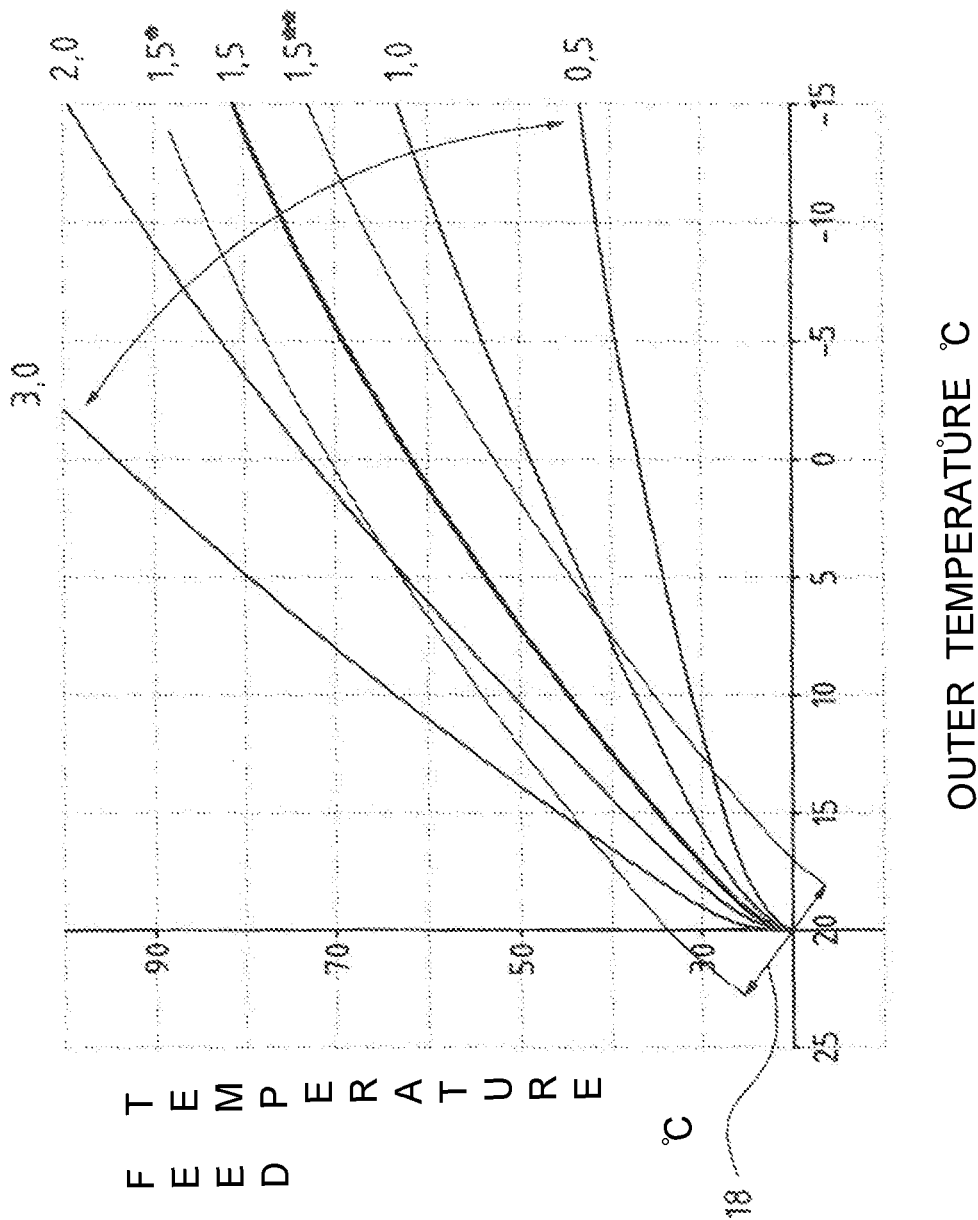

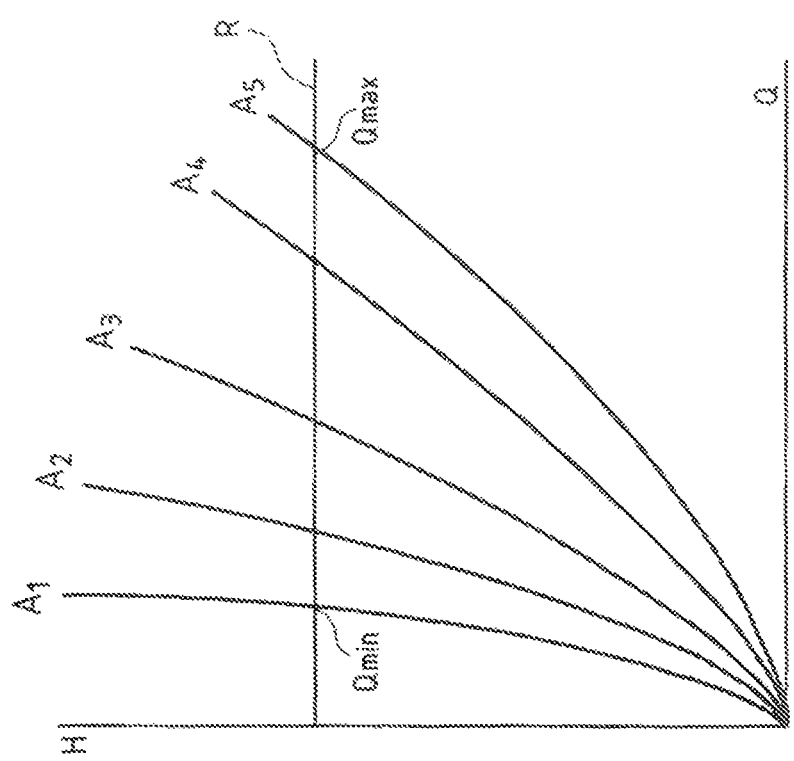
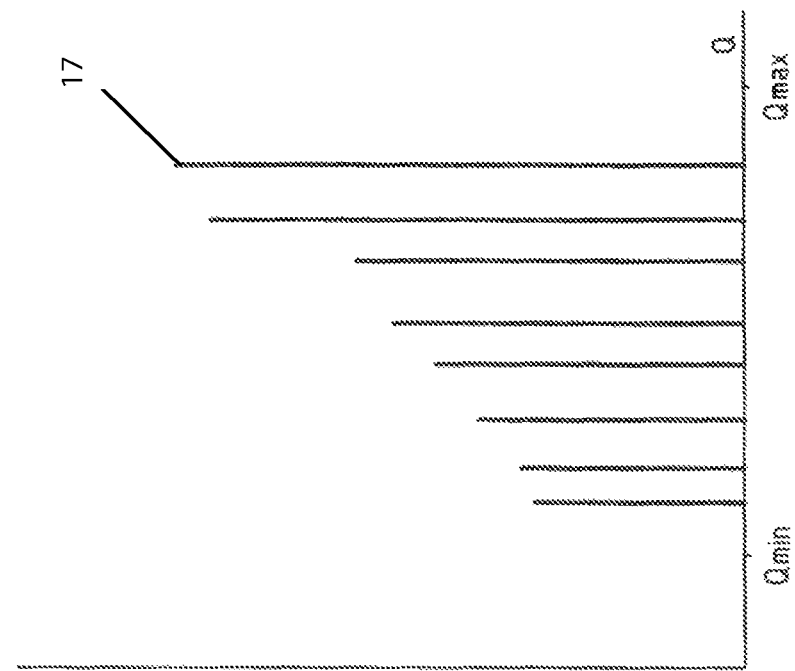

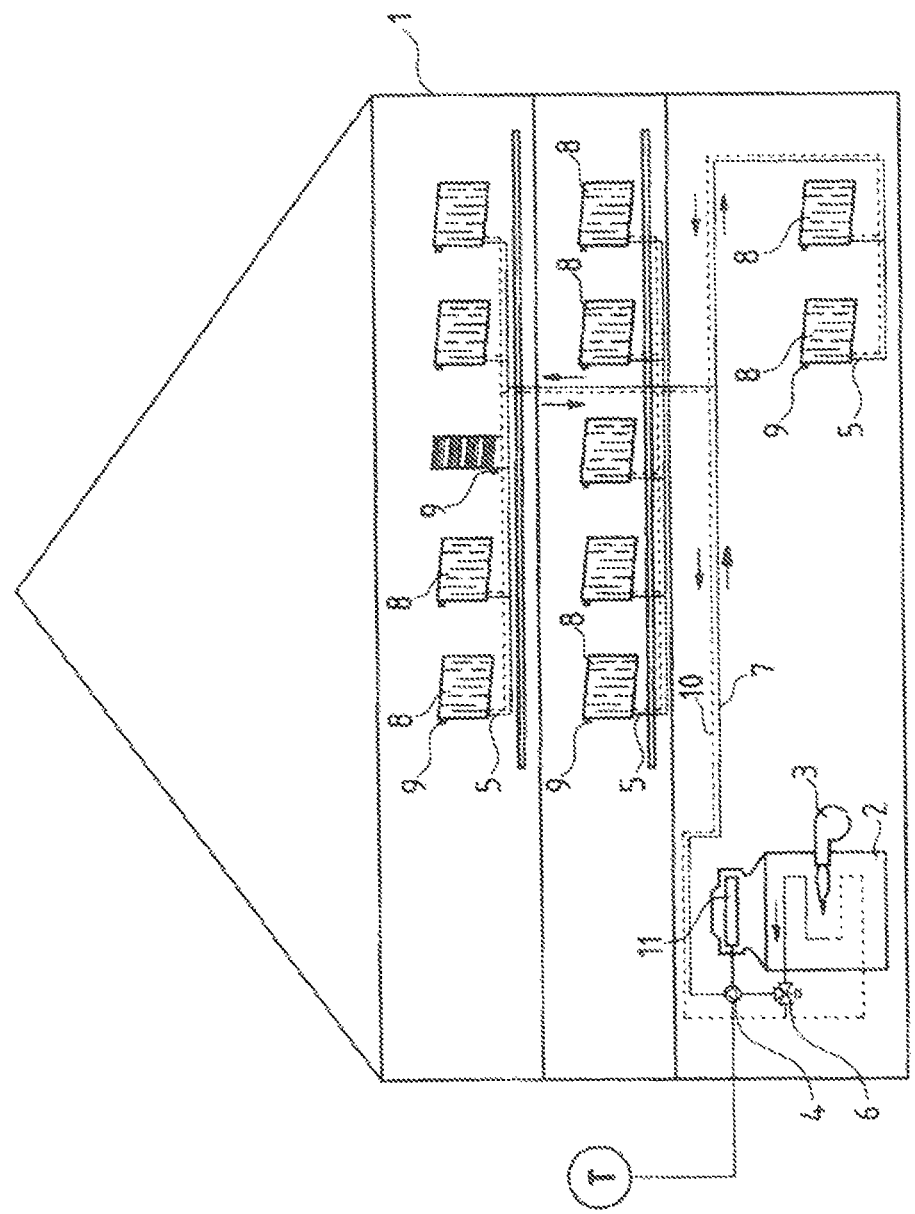

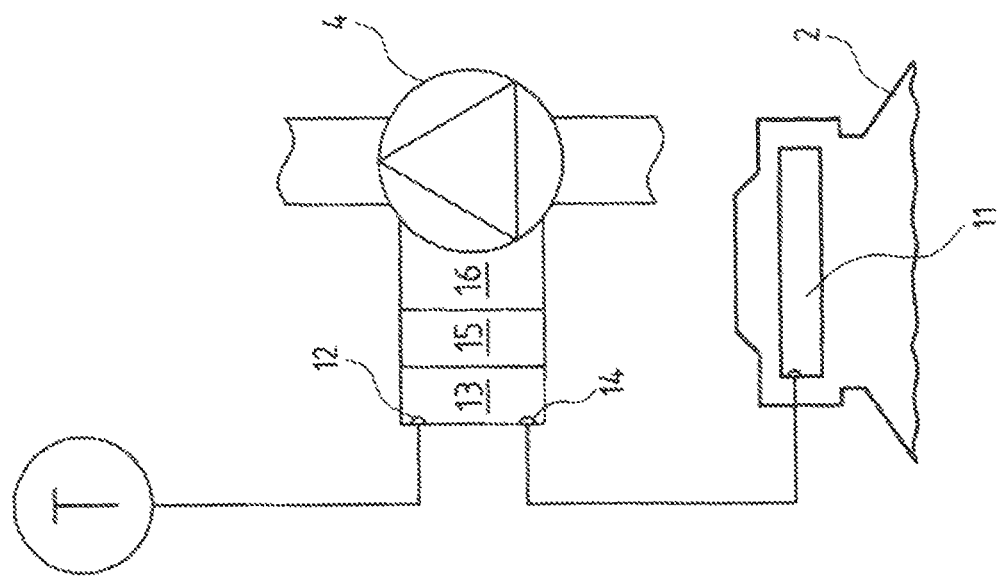

METHOD FOR ADAPTING A HEATING CURVE

CROSS REFERENCE TO RELATED APPLICATIONS

This application is a U.S. National Phase Application of International Application PCT/EP2014/071566 filed Oct. 8, 2014 and claims the benefit of priority under 35 U.S.C. § 119 of European Patent Application 13 188 789.5 filed Oct. 15, 2013, the entire contents of which are incorporated herein by reference.

FIELD OF THE INVENTION

The present invention relates to a method for adapting the control of the feed temperature of a heating installation to the building to be heated or at least to a building part to be heated, with which the heating installation supplies the building or the building part with heat by way of a heat transfer medium led in the circuit, wherein the circuit comprises at least one temperature-controlled heating circuit.

BACKGROUND OF THE INVENTION

Heating installations nowadays, independently of the type of heat production, comprise a control which sets the feed temperature of the heat transfer medium, typically water, which is in the circuit. The feed temperature is indicated as the temperature at which the heat transfer medium enters into the heating installation. With burners activated in a modulated manner, the entry of the heat transfer medium which comes from the primary heat exchanger and is heated there is effected typically directly into the heating installation, and with non-modulating burners by way of the intermediate connection of a mixing valve which admixes cooled water from the return to the heat transfer medium coming from the primary heat exchanger, according to the requirements. This method is independent on the type of energy conversion, thus is used with gas heating installations, oil heating installations, pellet heating installations or other ones. Thereby, a heating curve is implemented within the control of the heating installation and this determines the relation between typically the outer temperature of the building and the feed temperature associated with the heating circuit. This heating curve as a rule is set by the installer after the installation of the installation and it can be set with regard to its steepness as well as displaced in a parallel manner. The parallel displacement effects a lifting or reduction of the feed temperature independently of the outer temperature, whereas the change of the steepness or gradient changes the dependency of the outer temperature to the feed temperature. The steeper the heating curve, the more does the feed temperature increase given a falling outer temperature, and an adaptation in the reverse direction occurs when the heating curve becomes gentler (less steep).

Since the heating curve is usually set manually by the installer when installing the heating installation, a correction of the setting as a rule is only effected given an undersupplying setting, since with an oversupplying setting, the consumer as a rule does not notice this and otherwise a resetting by the heating installer causes costs. This leads to the heating installer tending to set the heating curve in an oversupplying manner rather that in an undersupplying manner, by which means the total efficiency of the heating installation is unfavourably influenced. Moreover, an oversupply, due to the thermostat valves in the heating installation which are then largely closed, can lead to undesirable noise annoyance.

SUMMARY OF THE INVENTION

Against this background, it is an object of the invention to provide a method for adapting the control of the feed temperature of a heating installation, which overcomes these disadvantages.

According to the invention, this object is achieved by a method for adapting the control of the feed temperature of a heating installation to a building to be heated or at least to a building part to be heated, with which the heating installation supplies the building or the building part with heat by way of a heat transfer medium led in the circuit, wherein the circuit comprises at least one temperature-controlled heating circuit and the flow rate of the heat transfer medium in the circuit is registered in a continuous manner or in temporal intervals and the adaptation of the control of the feed temperature is effected automatically in dependence on the registered values. Moreover, the invention provides a control for carrying out the method according to the invention, as well as a centrifugal pump with such a control.

The method according to the invention is envisaged for adaptation of the control of the feed temperature of a heating installation to a building to be heated or at least to a part of a building which is to be heated, and specifically for a heating installation with which a heat transfer medium is led in the circuit and with which the building or building part is supplied with heat, wherein the circuit comprises at least one temperature controlled heating circuit. According to the invention, the flow rate of the heat transfer medium in the circuit is registered which is to say detected continuously or in temporal intervals, and stored, wherein the adaptation of the control of the feed temperature is effected automatically in dependence on the registered values.

A basic concept of the method according to the invention is to automatically adapt the control of the feed temperature to the thermal requirements of the building or building part to be heated, in a targeted manner, by way of the detection of the flow rate of the heat transfer medium. Since heating circuits regulated by thermostat, for example radiators with thermostat valves or heating circuits of a floor heating with a thermostat regulation are prescribed nowadays with buildings, the flow rate in these heating circuits is essentially controlled with regard to the heating requirement. The thermostat regulation ensures that in the case of a thermal requirement in the room, the feed of the heat transfer medium is released partly or completely, whereas the feed is blocked or at least throttled on reaching the preset temperature. With the thermostat valves common today, this is usually effected mechanically or in a hydraulic-mechanical manner via the room temperature. Electrically controlled regulating valves which are actively connected to corresponding room temperature probes with a control are also known.

According to the invention, one can determine whether an oversupply, undersupply or optimal supply is effected solely by way of registering the flow rates of the heat transfer medium in the circuit, and accordingly an adaptation of the control of the feed temperature of the heating installation can be effected, in order in this manner to set the feed temperature such that it is as low as possible, in order to optimize the efficiency of the heating installation as far as this is concerned, but on the other hand is sufficiently high, in order to supply the building or building parts with heat in a sufficient manner. Thereby, the invention assumes that an optimal supply is given when the flow rate of the heat transfer medium in the circuit is as constant as possible, which is to say the thermostat valves have a middle opening degree.

Basically, a direct control of the feed temperature of a heating installation, at least an adaptation of the control of the feed temperature is possible with the method according to the invention. With the multitude of heating installations which are in operation and common today, the feed temperature is controlled in a suitable control of the heating installation by way of a heating curve which specifies at which outer temperature which feed temperature the heat transfer medium is to have. Thereby, the heating curve can be determined by the outer temperature and/or one or more other variables influencing the thermal requirement of the building or of the building part. The method according to the invention envisages an automatic adaptation of this heating curve for such heating installations which have such a heating curve for the control of the feed temperature.

Thereby, according to the invention, it is basically sufficient to merely detect the flow rate of the heat transfer medium in the circuit, in a continuous manner or in temporal intervals, but however according to a further development of the invention, the outer temperature or the feed temperature is advantageously also registered. The additional temperature registration simplifies the evaluation and thus improves the automatic adaptation. Thereby, the outer temperature as well as the feed temperature are to be detected in a simple manner, since an outer temperature probe is regularly provided with modern heating installations or a temperature probe is provided at least in the heating circulation pump, so that such a temperature value is available practically without any additional effort or expense.

Even if the continuous registration of the flow rate and, as the case may be, of the temperature results in a particularly accurate result with the evaluation, this however demands a high memory capability. Inasmuch as this is concerned, according to a further development of the invention, it is more favorable for the registration of the flow rate and as the case may be of the temperature to be carried out in temporal intervals between preferably 5 minutes and three hours. The number of readings and thus the necessary storage or memory capacity for these readings can be significantly reduced by way of this, without having to fear disadvantages with regard to the result. As is known, changes in the heating installation do not occur suddenly due to changes in the thermal requirement. Even for example if a window is opened, then the thermostat valve affected by this requires a certain amount of time to take this into account with regard to control technology. A measurement interval of five minutes or more is therefore sufficient for the method according to the invention.

In order to adapt the control of the feed temperature to the current thermal requirement, according to the invention one envisages evaluating only a number of lastly registered values, preferably those of the last twelve hours to thirty days.

According to the invention, for adapting the heating curve, its steepness can be changed and/or this can be displaced in a parallel manner. Thereby, the change of the steepness of the heating curve is provided, in order to adapt the feed temperature to the thermal requirement of the building or building part to be heated, at any outer temperature, thus from summer to winter. Such a change in the steepness however assumes the registering and evaluation of the flow rate values and, of the temperature values as the case may be, over the longer term, typically at least over the time period of one year. The parallel displacement of the heating curve changes the magnitude of the feed temperature, is thus also in particular suitable for a short-term adaptation. Such a parallel displacement for adapting the control of the feed temperature, as the case may be, is effected by way of registered values of the last twelve hours to thirty days.

Thereby, according to a further development of the invention, the adaptation of the control of the feed temperature or the adaptation of the heating curve can advantageously be effected by way of a distribution of the registered flow rate values, and the distribution being statistically evaluated. Thereby, the evaluation is effected preferably such that a maximal value of the flow rate values, a minimum value of the flow rate values and a mean value of the flow rate values are determined, wherein the mean value represents a concentration in the distribution of the flow rate values, thus does not represent a mathematic mean value but a statistical means of the distribution which represents the greatest concentration of individual values. Thereby, a certain statistical evaluation makes sense here, in order to find out where a concentration of flow rate values is present as the case may be, between the minimal value and maximal value.

If the mean value lies closer to the maximal value than to the minimal value, thus the concentration of the distribution of the flow rate values lies closer to the maximal value than to the minimal value, then according to the invention the feed temperature is increased or the heating curve is displaced to higher feed temperatures and, when the means is closer to the minimal value than to the maximal value, the feed temperature is lowered or the heating curve is displaced to lower feed temperatures. This corrective is based on the recognition that the feed temperature or the heating curve should be selected such that the concentration in the distribution of the flow rate values in the ideal case should lie in the middle between the minimal value and the maximal value, since it can then be assumed that the heat transfer medium is pumped through the heating installation with an essentially constant flow rate and thus the heat quantity introduced via the feed of the temperature installation corresponds to that which is necessary for the building with regard to thermal requirements, so that the thermostat valves in the ideal case are located in a middle position, in which they have a high valve and regulating authority, the flow resistance tends to be low, a noise formation is reliably avoided and pump power is saved.

Thereby, according to an advantageous further development of the method according to the invention, one envisages increasing the feed temperature or setting the heating curve more steeply if the distribution of the flow rate values over at least one year time period has a concentration between the minimal value and maximal value, close to the maximal value. Such a distribution of the flow rate values typically results when the heating curve is too gentle, since then the feed temperature is too low at lower outer temperatures, which means that the thermostat valves are widely opened.

If in contrast, over a year time period, a distribution of the flow rate values is ascertained which has two concentrations between the maximal value and the minimal value, then according to the invention, one envisages lowering the feed temperature or setting the heating curve in a gentler manner. Such a distribution typically results with a heating curve which is too steep, since then at lower outer temperatures the feed temperature is too high which means the thermostat valves are almost closed, whereas at lower outer temperatures the feed temperature is too low which means the thermostat valves are opened.

In order to correct the steepness of the heating curve according to the previously mentioned concentration criteria, it is necessary to detect the flow rates over at least a one year period. If a correction of the heating curve by way of parallel displacement is also effected within this year period, which can likewise be envisaged according to the invention, then as the case may be, the correction of the steepness of the heating curve can then be effected whilst taking the previously undertaken parallel displacement into account. This means that in particular the consecutive parallel displacement of the heating curve firstly to the top and then to the bottom or vice versa is an indication that the steepness of the temperature curve is not adapted and a corrective can be undertaken as far as this is concerned. According to the invention, these combinations, which is to say the parallel displacement of the heating curve and the change of the steepness can be fixed by way of suitable conditions and typically implemented in the control with regard to software.

If in contrast, according to the method according to the invention, a direct adaptation of the feed temperature is effected, then these differentiations are not necessary, since the setpoint of the feed temperature is automatically set with the method according to the invention and is optimized already just shortly after operation of the installation.

Particularly advantageously, the feed temperature and the outer temperature can also be used additionally or alternatively to the distribution of the flow rate values. Thus, according to the invention, the heating curve is set more steeply if the flow rate increases with an increasing feed temperature or falling outer temperature. This adaptation is based on the knowledge that the thermal requirement of the building or of the building part is still not yet covered when with an increasing feed temperature or falling outer temperature, the flow rate increases, so that the increase in the feed temperature is not yet sufficient, in order to cover the thermal equipment given a preferred middle position of the thermostat valves. Vice versa, according to the invention, one envisages setting the heating curve in a gentler manner if the flow rate drops given a falling feed temperature or increasing outer temperature.

In contrast, it is useful to displace the heating curve to lower feed temperatures for a short-term adaptation, if the flow rate increases with a falling feed temperature or with an increasing outer temperature, and vice versa to displace the heating curve to higher feed temperatures if the flow rate drops with an increasing feed temperature or with a falling outer temperature. A statistical evaluation of the flow rate values is advantageously effected, in order in these cases, to be able to differentiate as to whether the steepness of the heating curve or the level of the heating curve are to be adapted, wherein the values over at least a one year time period are to be drawn on for the steepness correction, wherein the values of the last twelve hours to thirty days are to be used for the short-term adaptation to the thermal requirement.

The method according to the invention is particularly advantageously implemented into the control of a pump circulating the heat transfer medium, in particular a heating circulation pump. Then, according to an advantageous further development of the method according to the invention, the adaptation of the control of the feed temperature or the adaptation of the heating curve of the heating installation can be effected by way of the outer temperature signal which is led to the heating control being adapted, which means being simulated. The control electronics of the heating circulation pump in the application of the method according to the invention then simulates an outer temperature at the control of the heating installation, and this temperature is selected such that the desired change of the feed temperature is generated on the part of the control of the heating installation. If for example with the method according to the invention, an undersupply is ascertained in the control electronics of the heating circulation pump, then an outer temperature signal for the heating control is generated by the control electronics of the pump and this signal specifies an accordingly lower temperature than the actual outer temperature. For this, it is useful if the control electronics of the pump is affected by the outer temperature signal of the temperature probe of the heating control. The method according to the invention can be carried out in this manner irrespectively of the applied heating control and without any special interface for the heating control, by way of the control electronics of the heating circulation pump, and by way of the issued temperature signal for the heating control can be transferred to the heating control.

A control for carrying out the method according to the invention is advantageously formed as part of the control electronics of an electronic speed controller of a centrifugal pump, which is provided for circulating the heat transfer medium in the heating installation, or is implemented into the control electronics. Modern heating circulation pumps are speed-regulated which is to say controlled with a closed loop with regard to spread, and they comprise an electronic speed controller, in particular a frequency converter which not only permits the pump to be driven in a wide speed range, but which furthermore envisages a regulated operation. For example, the pump can be activated with a constant pressure or with proportional pressure which means a regulating curve is produced, which produces a constant pressure independently of the flow rate, or in the case of a proportional pressure curve produces a flow rate increasing with an increasing pressure. Extensive control and regulation electronics are necessary for this, which is why the implementation of the method according to the invention into these control electronics as a rule is possible without any additional effort with regard to hardware and thus in an inexpensive manner. Thereby, advantageously, depending on the characteristics of the applied motor/pump combination, in the ideal case the flow rate values are determined in the control electronics of the speed controller by way of electrical values in a sensorless manner. With motor/pump combinations, with which this is not possible without a sensor due to the unambiguity on assigning the electrical values of the motor to the hydraulic values of the pump, according to the invention, a flow sensor or a pressure sensor is provided within the pump. Such sensors are counted as belonging to the state of the art and can be manufactured inexpensively nowadays. In this context, the use of vortex flowmeters is referred to, with which the flow is determined by way of vortices forming behind an obstruction, or by way of an electronic evaluation device cooperating with the pressure sensor, for determining the flow rate. Although it is particularly advantageous to implement the method according to the invention into the control of the heating circulation pump, in particular into the control electronics of the speed controller or frequency converter, the method according to the invention can however also be implemented into control electronics which is independent of this, wherein it is advantageous if these control electronics form at least one constructional unit with the heating circulation pump.

Furthermore, according to the invention, a temperature sensor is advantageously arranged in the heating circulation pump for detecting the feed temperature. If on the pump side, an input for a signal of an outer temperature probe as well as an output for a temperature signal for the heating control are provided in the control, which is advantageous, then the method according to the invention, whilst using the present conditions of the heating installation, can be carried out without intervention in the heating control merely by way of applying a suitably designed or equipped heating circulation pump, wherein only the existing outer temperature probe of the heating insulation is to be connected to the signal input for the outer temperature probe of the pump control, and the respective signal output of the pump control is to be connected to the signal input for the outer temperature probe of the heating control. The respective adaptation of the activation of the feed temperature or of the adaption of the heating curve is then effected by way of simulation of the outer temperature signal led to the heating installation, by way of the control of the pump.

The invention is hereinafter explained in more detail by way of representational drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a representation of a heating curve and its adaptation by way of parallel displacements and changes of the steepness;

FIG. 2a is a schematic representation, the frequency distribution of the registered flow rate values in the heating circuit during a time interval of thirty days;

FIG. 2b is an Q-H diagram with a regulating curve and installation system curves;

FIG. 3 is a schematic representation, the central heating installation of a house; and FIG. 4 is an enlarged schematic representation, a heating circulation pump with a temperature signal output for a heating control and an input for an outer temperature probe.

DESCRIPTION OF THE PREFERRED EMBODIMENTS

A central heating installation with some typical features is schematically represented in FIG. 3. A heating boiler 2 is arranged in a building 1, in which boiler heating water is heated by way of a burner 3 in a primary heat exchanger which is not represented, and this heating water is led in the circuit and is pumped by way of a heating circulation pump 4 in the circuit through the heating circuit 5 connected to the circuit. Thereby, the warm water exiting from the primary heat exchanger, via a mixing valve 6 gets into the feed 7 of the installation, in which it is fed via the pump 4 to the heating circuits 5 which each comprise a secondary heat exchanger 8 in the form of a radiator connected to the heating circuit 5 via a thermostat valve 9.

The returns of the heating circuits 5 run out in a central return 10 which is led to the mixing valve 6 and parallel to the entry of the primary heat exchanger of the heating boiler. With the represented heating installation, the feed temperature in the feed 7 is determined by the temperature of the heated heating water exiting from the primary heat exchanger and the position of the mixing valve 6, wherein the mixing valve position 6 and the control of the burner 3 are effected by way of a control 11 in the heating boiler 2, said control controlling the feed temperature in dependence on the outer temperature, wherein the outer temperature is determined via an outer temperature probe T. With heating controls according to the state of the art, the outer temperature probe T is directly connected to the control of the heating boiler for this.

As FIG. 4 illustrates, with the embodiment according to the invention, the temperature probe T is not connected to the heating boiler, but to a signal input 12 of a control 13 of the heating circulation pump 4. This control 13 comprises a signal output 14 which is signal-connected to the signal input for the temperature probe T of the control 11 of the heating boiler 2. The boiler control 11 via the signal output 14 receives a temperature value adapted by the control 13 whilst taking into account the evaluation carried out in the control 13 and according to the method according to the invention which is initially described. The control 13 forms part of control electronics 15 of a frequency converter 16 activating the motor of the pump. The control electronics 15 of the frequency converter 16 has an electronic speed control for the pump and produces a regulating curve R (see FIG. 2b), with which the pump is operated. The operating points which set in are formed by the intersection points of the respective system curves A1-A5 with the regulating curve R. The system curve changes due to the changing thermostat settings of the heating circuits. The regulating curve R for example is a constant pressure curve as is represented in FIG. 2b, so that the different operating points only differ in the flow rate. These relations have been known for some time and will therefore not be described in detail here.

The operating points resulting on operation of the heating installation are detected in time intervals of five minutes within the control 13 and are stored, wherein after a predefined time interval of e.g. thirty days, the flow rate values Q setting in at the respective operating points are detected with regard to their distribution and frequency. This detection or acquisition is represented by way of example in FIG. 2a. A minimal flow rate $Q_{min}$ and a maximal flow rate $Q_{max}$ are determined by way of this detection, and the remaining flow values are sorted according to frequency and are plotted in a diagram or are electronically processed in a corresponding manner. The maximal concentration of flow rate values there results at a bar point 17 (in FIG. 2a) which lies close to the maximal flow value $Q_{max}$.

One can conclude from this distribution of the frequencies of the flow rate values Q that the greatest concentration of operating points lies in the maximal flow 17, which permits the conclusion that the thermostat valves 9 of the heating installation were often widely opened, from which in turn one can conclude that the temperature of the water led in the circuit as a heat transfer medium was too low. The control 13 therefore increases the setpoint for the feed temperature, which in the heating curve 1,5 according to FIG. 1 corresponds to a parallel displacement in the direction of greater temperatures according to the double arrow 18. If the maximal concentration value 17 lies close to the minimal flow value $Q_{min}$, then the parallel displacement is effected in the opposite direction, which means to say to lower feed temperatures. In the heating curve diagram represented in FIG. 1, the heating curve shifted towards higher feed temperatures is characterized at 1,5\* and the heating curve shifted towards lower feed temperatures is characterized at **1,5\*\*. In an analogous manner, the steepness of the heating curve 1,5 can be changed by the control 13** to steeper heating curves 2,0 or 3,0 or to more gentle heating curves 0,5 and 1,0, by way of detecting the flow rate values over at least one year, as has been described initially.

The control 13 carrying out the method according to the invention forms a construction unit with the heating circulation pump 4. It detects the outer temperatures via an outer temperature probe T. Since the heating boiler control 2 usually has no separate input for the control of the setpoint of the feed temperature, but this is to be optimized with the method according to the invention, this is effected at the heating circulation pump 4 by way of simulation of the outer temperature. For this, the temperature signal present at the signal output 14 is changed within the control 13 whilst taking into account the actual outer temperature determined by the temperature probe T, so that the control 11 of the heating boiler 2 produces the optimized feed temperature which is determined by the control 13 according to the method according to the invention by way of the flow rate values.

It is to be understood that a direct adaptation of the setpoint for the feed temperature can also be effected for the feed temperature without a temperature signal simulation, given a suitable interface between the control 11 and the control 13.

It can also be advantageous to design the control 13 separately from the pump, and then the determining of data is effected in the pump and is transferred to the control 13 in a wireless manner or by cable. In this manner, the control 13 can be applied with existing circulation pumps which are controlled by frequency converter e.g. of the type Grundfos Redwolf.

In this manner, due to the method according to the invention, one can realize a pump which is operated at an essentially constant volume flow and can be designed such that it runs in the region of its optimal efficiency.

While specific embodiments of the invention have been shown and described in detail to illustrate the application of the principles of the invention, it will be understood that the invention may be embodied otherwise without departing from such principles.

The invention claimed is:

1. A method for adapting a control of a feed temperature of a heating installation to a building to be heated or at least to a building part to be heated, the method comprising the steps of:
   supplying, with the heating installation, the building or the building part with heat by way of a heat transfer medium led in a circuit, the heating installation comprising a boiler, the boiler comprising boiler control electronics;
   providing the circuit such that the circuit comprises at least one temperature-controlled heating circuit;
   registering a flow rate of the heat transfer medium in the circuit in a continuous manner or in temporal intervals to provide registered values; and
   effecting an adaptation of the control of the feed temperature automatically in dependence on the registered values via adaptation of a heating curve which determines the feed temperature of the heat transfer medium based on an outer temperature, wherein the adaptation of the control of the feed temperature or of the heating curve of the heating installation is effected by way of adapting an outer temperature signal for a heating control in pump control electronics of a pump circulating the heat transfer medium to provide feed temperature setpoint data, the pump control electronics being connected to the boiler control electronics via a data connection, wherein the boiler control electronics receive the feed temperature setpoint data from the pump control electronics via the data connection.

2. The method according to claim 1, wherein the outer temperature or the feed temperature is also registered, the outer temperature being detected via a temperature sensor, the temperature sensor being connected to the pump control electronics via another data connection.

3. The method according to claim 2, wherein the registration of the flow rate and, of the temperature is effected in temporal intervals between five minutes and three hours.

4. The method according to claim 1, wherein only a number of the lastly registered values are evaluated, of a last twelve hours to thirty days, for the adaptation of the control of the feed temperature.

5. The method according to claim 1, wherein for the adaptation of the heating curve a heating curve steepness is changed or the heating curve steepness is displaced in a parallel manner or a heating curve steepness is changed and the curve steepness is displaced in a parallel manner.

6. The method according to claim 1, wherein a distribution of registered flow rate values is effected and the distribution is statistically evaluated, wherein a maximal value of the registered flow rate values, a minimal value of the flow rate values and a mean value of the flow rate values are determined, wherein the mean value represents a concentration in the distribution of the flow rate values.

7. The method according to claim 6, wherein the feed temperature is increased or a heating curve is displaced towards higher feed temperatures when the mean value lies closer to the maximal value than to the minimal value, and the feed temperature is lowered or the heating curve is displaced towards lower feed temperatures when the mean value lies closer to the minimal value than to the maximal value.

8. The method according to claim 6, wherein the feed temperature is increased or a heating curve is set more steeply, if the distribution of the flow rate values over at least a one year time period has a concentration close to the maximal value.

9. The method according to claim 6, wherein the feed temperature is lowered or a heating curve is set with a decreased steepness, if the distribution of the flow rate values over a year time period has two concentrations between the maximal value and the minimal value.

10. The method according to claim 1, wherein the heating curve is set more steeply if the flow rate increases with an increasing feed temperature or falling outer temperature.

11. The method according to claim 1, wherein the heating curve is set with a decreased steepness if the flow rate drops with a falling feed temperature or increasing outer temperature.

12. The method according to claim 1, wherein the heating curve is displaced towards higher feed temperatures if the flow rate drops with an increasing feed temperature or with a falling outer temperature.

13. The method according to claim 1, wherein the heating curve is displaced towards lower feed temperatures if the flow rate increases with a falling feed temperature or with an increasing outer temperature.

14. The method according to claim 1, wherein the boiler control electronics are located at a spaced location from the control of the feed temperature or of the heating curve of the heating installation, wherein the boiler control electronics are a separate control from the control of the feed temperature or of the heating curve of the heating installation.

15. The method according to claim 14, wherein the control of the feed temperature or of the heating curve of the heating installation forms part of a frequency converter of the pump circulating the heat transfer medium.

16. A control, the control being a part of control electronics of an electronic speed controller of a heating circulation pump or at least forms a construction unit with the heating circulation pump, the control being configured to:
- supply, with a heating installation, a building or a building part with heat by way of a heat transfer medium led in a circuit;
- provide the circuit as at least one temperature-controlled heating circuit;
- register a flow rate of the heat transfer medium in the circuit in a continuous manner or in temporal intervals;
- effect an adaptation of the control of a feed temperature automatically in dependence on registered values via adaptation of a heating curve which determines the feed temperature of the heat transfer medium based on an outer temperature, wherein the adaptation of the control of the feed temperature or of the heating curve of the heating installation is effected by way of adapting an outer temperature signal for a heating control in control electronics of a pump circulating the heat transfer medium to provide feed temperature setpoint data; and
- provide the feed temperature setpoint data to a boiler controller of a boiler of the heating installation via a data connection, the data connection being connected to the boiler controller and the control.

17. The control according to claim 16, wherein an input for a signal of an outer temperature probe as well as an output for a temperature signal are provided, wherein the control comprises means for adapting the outgoing temperature signal for a simulation of the adaptation of the feed temperature control or of a heating curve of the heating installation.

18. A heating circulation pump, wherein a temperature sensor is arranged in the heating circulation pump for detecting a feed temperature; and
- a control as a part of control electronics of an electronic speed controller of the heating circulation pump or forming a construction unit with the heating circulation pump, the control being configured to:
- supply, with a heating installation, a building or a building part with heat by way of a heat transfer medium led in a circuit;
- provide the circuit as at least one temperature-controlled heating circuit;
- register a flow rate of the heat transfer medium in the circuit in a continuous manner or in temporal intervals; and
- effect an adaptation of the control of the feed temperature automatically in dependence on registered values via adaptation of a heating curve which determines the feed temperature of the heat transfer medium based on an outer temperature, wherein the adaptation of the control of the feed temperature or of the heating curve of the heating installation is effected by way of adapting an outer temperature signal for a heating control in control electronics of a pump circulating the heat transfer medium to provide a feed temperature setpoint data; and
- provide the feed temperature setpoint data as input to a boiler controller of the heating installation via a data connection, the data connection being connected to the heating circulation pump and the boiler controller.

19. The heating circulation pump according to claim 18, wherein a flow rate sensor is provided in the heating circulation pump.

20. The heating circulation pump according to claim 18, wherein the flow rate of the pump is determined without any sensor by way of electrical values of an electric motor driving the pump, by way of the pump control electronics.

* * * * *